No. 647,021. Patented Apr. 10, 1900.
J. O'ROURKE.
PORTABLE TOOL FOR WORKING STONE, &c.
(Application filed Feb. 6, 1899.)
(No Model.)
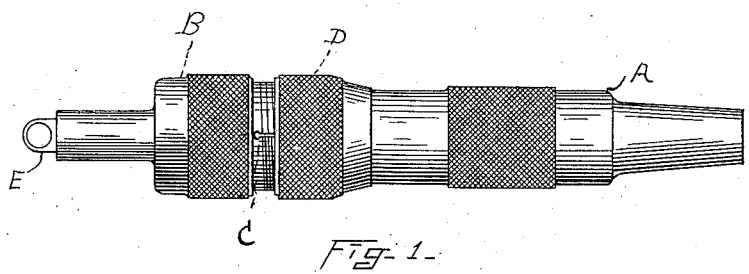
Fig-1-
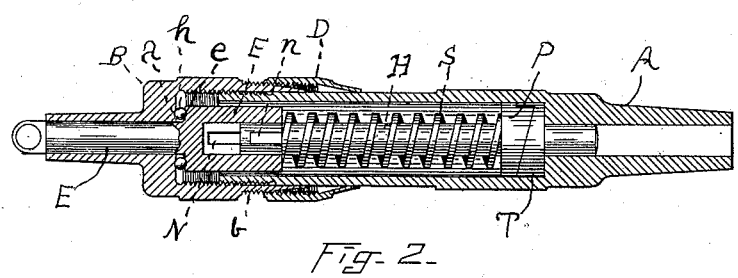
Fig-2-
Fig-3-
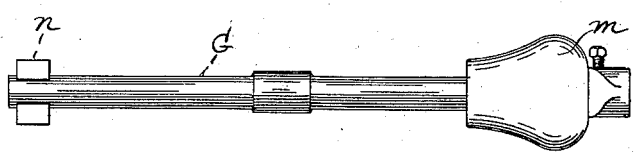
Fig-4-
WITNESSES
A. M. Tuttle
M. M. Tuttle
INVENTOR
John O'Rourke
by his atty:
C. B. Tuttle

UNITED STATES PATENT OFFICE.

JOHN O'ROURKE, OF SALEM, MASSACHUSETTS.

PORTABLE TOOL FOR WORKING STONE, &c.

SPECIFICATION forming part of Letters Patent No. 647,021, dated April 10, 1900.

Application filed February 6, 1899. Serial No. 704,640. (No model.)

*To all whom it may concern:*

Be it known that I, JOHN O'ROURKE, a citizen of the United States of America, and a resident of Salem, county of Essex, and Commonwealth of Massachusetts, have invented certain Improvements in Portable Tools for Working Stone and other Materials, of which the following, read in connection with the accompanying drawings, is a specification.

This invention has for its object primarily to provide means for pounding, drilling, cutting, polishing, and otherwise working upon stone materials, but is useful in other ways.

In the drawings, Figure 1 shows a plan, and Fig. 2 a longitudinal section, of the tool embodying this invention. Fig. 3 shows the tool-actuating spindle detached. Fig. 4 shows a modified form of a tool-carrying chuck-spindle.

The supporting-shell, which also constitutes a handle or take-hold for the workman to lift and carry the tool about by, comprises the tubular parts A B, which, having screw-threaded connection, telescope one into the other, as shown in Fig. 2. The part B is provided with grooves or cuttings C, and has an outer beveled screw-threaded section $b$, adapted for engagement with the screw-threaded nut D, whereby the part B may be clamped tightly to the part A and the two parts A B will thus be held as one and prevented from displacement during operation of the tool in working use.

The chuck-shaft E has its tang end journaled for support and movement rotatively in the part B. Its rearmost end projecting outwardly from the part B, affords means for connection with an ordinary flexible shaft through which power may be applied for rotating the chuck-shaft. In the parts B E are formed the annular grooves $a\ e$ to receive the balls $h$, whereby is established a ball-bearing to receive the end thrust or pressure of chuck-shaft E, resulting from a blow or pressure of the tool upon its work. In the foremost or head end of said chuck-shaft E is a slot N and socket adapted for receiving the end and key $n$ of spindle H, through which connection, it will be understood, motion rotatively may be applied from chuck-shaft E to the spindle H. At the same time the spindle H will permit longitudinal movement in the end of the chuck-shaft E. Said spindle H carries a cam P, arranged for contact with the cam T, which has fixed support in the part A, and on the spindle H is a spiral spring S, bearing one end on the cam P and the other end against the chuck-shaft E.

It will now be understood that movement of spindle H rotatively operates the cam P against the cam T for moving the spindle H longitudinally in one direction, carrying and further contracting the spring S against the end of chuck-shaft E, and when the cams P and T arrive to the position for permitting it this spring S reverses the movement longitudinally of said spindle H. This spring-driven movement of the spindle H is imparted to the drill, chisel, or other tool, which for the time is socketed in the part A and operates the blow for driving said tool against the work material.

It is to be observed that the parts A B, by reason of the telescoping screw-threaded connections thereof, permit being moved so as to lengthen or shorten the distance between cam T and the end face of chuck-shaft E, which movement operates a corresponding expansion or contraction of the spring S for reducing and increasing the strength of blow applicable to the working tool. Desired adjustment of said parts, being secured, is maintainable by the locking-nut D.

Instead of the drilling or pounding action referred to above it may be desirable at times to use the tool for smoothing and polishing or boring, and to this end I have represented in the drawings, Fig. 4, the shaft G, having on its end a chuck $m$ for receiving the tang end of a bit or other tool. Said shaft may be substituted in place of the spindle H and receive rotative movement simply from chuck-shaft E.

The tool as a whole may obviously be lifted and moved about by the workman at will.

I claim—

1. The combination with a longitudinally-slotted chuck-shaft, a spring-actuated spindle having a key at one end adapted to have sliding connection in the slots of the chuck-shaft and said spindle having cams on one end, of a pair of tubular parts inclosing the chuck-shaft and spindle and screwed together whereby the tool may be lengthened or shortened and the tension of the spring regulated, one tube having ball-bearings to receive the thrust of the chuck-shaft and the other tube having a cam therein which coöperates with the cam on the spindle to give a sudden smart endwise impulse to said spindle.

2. The combination with a chuck-shaft having a ball-race on its rear end furnished with longitudinal elongated slots, a spring-actuated spindle having a key at one end adapted to have sliding connection in the slots of the chuck-shaft, the spindle having cams on one end, and a spring surrounding the spindle and held between the cam and the chuck-shaft, of a pair of tubular parts inclosing the chuck-shaft and spindle, and secured together, one of said parts having a ball-race and the other a cam, and balls held between the ball-race in said outer section and the rear of the chuck-shaft.

Signed by me at Lynn, Massachusetts, this 3d day of February, A. D. 1899.

JOHN O'ROURKE.

Witnesses:
M. M. TUTTLE,
C. B. TUTTLE.